(12) United States Patent
Armellin et al.

(10) Patent No.: US 6,397,911 B1
(45) Date of Patent: Jun. 4, 2002

(54) HIGH TRANSVERSE-CURVATURE MOTOR-BIKE TIRE

(75) Inventors: Giancarlo Armellin, Nova Milanese (IT); Peter Kronthaler; Thomas Zoller, both of Munich (DE)

(73) Assignee: Pirelli Pneumatici S.p.A., Milan (IT)

( * ) Notice: Subject to any disclaimer, the term of this patent is extended or adjusted under 35 U.S.C. 154(b) by 0 days.

(21) Appl. No.: 09/218,362

(22) Filed: Dec. 22, 1998

Related U.S. Application Data

(60) Provisional application No. 60/074,024, filed on Feb. 9, 1998.

(30) Foreign Application Priority Data

Dec. 29, 1997 (EP) .............................................. 97830724

(51) Int. Cl.⁷ .............................. B60C 1/00; B60C 9/12; B60C 9/18; B60C 9/20; B60C 9/22
(52) U.S. Cl. ........................ 152/458; 152/527; 152/531; 152/532; 152/533; 152/549; 156/117
(58) Field of Search ................................. 152/531, 533, 152/527, 458, 532, 549; 156/117

(56) References Cited

U.S. PATENT DOCUMENTS

| | | | | |
|---|---|---|---|---|
| 4,869,307 | A | * 9/1989 | Bormann et al. | ........... 152/533 |
| 5,178,703 | A | * 1/1993 | Onoda et al. | ............... 152/533 |
| 5,562,792 | A | 10/1996 | Caretta | |

FOREIGN PATENT DOCUMENTS

| | | | |
|---|---|---|---|
| DE | 39 11 031 A1 | * 10/1989 | ................. 152/533 |
| EP | 0329589 A2 | 8/1989 | |
| EP | 0 635 383 A1 | 1/1995 | |
| EP | 0 703 102 A2 | 3/1996 | |
| EP | 0 718 122 A1 | 6/1996 | |
| EP | 0 756 949 A1 | 2/1997 | |
| EP | 0808730 A1 | 11/1997 | |
| GB | 2 283 215 A | 5/1995 | |
| JP | 1-254404 | * 10/1989 | ................. 152/533 |

OTHER PUBLICATIONS

U.S. Patent Application Ser. No. 09/217,912; filed Dec. 22, 1998; inventors Giancarlo Armellin et al.; entitled "High Transverse–Curvature Tire for Two–Wheeled Vehicles".

S. Kazuhide, "Radial Tire for Two–Wheeled Vehicle", Patent Abstracts of Japan, vol. 098, No. 003, JP 9–286204, Bridgestone Corp., Nov. 4, 1997.

* cited by examiner

Primary Examiner—Adrienne C. Johnstone
(74) Attorney, Agent, or Firm—Finnegan, Henderson, Farabow, Garrett & Dunner, L.L.P.

(57) ABSTRACT

A high transverse-curvature tire for two wheeled-vehicles comprises a carcass structure, a belt structure including radially-inner and radially-outer layers, and a tread. The radially-inner layer comprises at least one strip made of an elastomeric material incorporating a plurality of reinforcing cords essentially parallel to one another and oriented along directions inclined with respect to the equatorial plane of the tire. The radially-outer layer includes a plurality of circumferential coils, axially arranged side-by-side, of at least one circumferentially-inextensible cord wound at a substantially null angle with respect to the equatorial plane of the tire according to a winding direction adapted to compression-stress elastomeric material portions interposed between consecutive reinforcing cords incorporated in the at least one strip of the radially-inner layer.

12 Claims, 4 Drawing Sheets

HIGH TRANSVERSE-CURVATURE MOTOR-BIKE TIRE

Applicants claim the benefit under 35 U.S.C. §119(e) based on prior-filed, copending provisional application No. 60/074,024, filed Feb. 9, 1998, in the U.S. Patent and Trademark Office; the contents of which are relied upon and incorporated herein by reference.

DESCRIPTION

Background of the Invention

In its more general aspect, the present invention relates to a high transverse-curvature tire for two-wheeled vehicles.

More particularly, the invention relates to a tire preferably, though not exclusively, usable in the so-called high-performance "touring" motor-bikes, of the type comprising:

- a carcass structure including at least one ply provided with reinforcing cords essentially parallel to one another and oriented along directions inclined with respect to the equatorial plane of the tire;
- a belt structure coaxially extending around the carcass structure and including a radially inner layer comprising at least one strip made of an elastomeric material including a plurality of reinforcing cords essentially parallel to one another and oriented along directions inclined with respect to the equatorial plane of the tire;
- a tread, coaxially extending around the belt structure.

KNOWN ART

In the field of production of tires for two-wheeled vehicles, and in particular, those intended for equipping the so-called "touring" motor-bikes generally having a swept volume exceeding 1000 cm$^3$, a high weight and a high torque, the need is increasingly felt of providing ever higher performances in terms of stability of the vehicle at high speed, kilometric yield, wear uniformity and regularity, road behavior both in straight stretch and in curve, and low weight.

In order to fulfill this need, tires for two-wheeled vehicles have been manufactured for a long time with a carcass structure comprising a couple of plies of rubberized fabric reinforced with cords symmetrically inclined with respect to the equatorial plane of the tire—which carcass structure is also known as cross-plies carcass—and possibly an intermediate structure (breaker), also realized with couples of strips of rubberized fabric provided with cords arranged at an angle with respect to the tire equatorial plane.

Even though this tire structure could ensure an extremely regular curve behavior of the motor-bike, the use of this type of tires involved problems of comfort, stability of the vehicle at high speed, and especially of irregular wear of the tread, often associated with removal of bulk portions of rubber according to a phenomenon referred to in the art by the term: "chunking".

To try to prevent these drawbacks, it has been suggested to use a tire having a radial carcass and provided with a belt structure comprising at least a couple of strips of rubberized fabric with cords arranged at an angle with respect to the equatorial plane of the tire or, alternatively, a coil of cords, preferably made of metal, oriented in a circumferential direction and known in the art by the term of: zero-degree cords.

Even though this type of tire has improved the situation as concerns comfort and stability of the vehicle at high speed along a straight-away with a substantial elimination of chunking phenomena—their low stiffness in the transverse direction markedly penalize their curve behavior.

Actually, the motor-bikes equipped with this type of tire are particularly subject to an undesired "floatation" effect while running along a curve, otherwise known by the term of "pudding effect", which causes the motor-bike to undergo a swaying phenomenon that would not be easily damped and that, in some cases, may be even self-amplifying. In extreme conditions, this phenomenon may even lead drivers to lose control of the vehicle, with obviously deleterious consequences.

SUMMARY OF THE INVENTION

According to the present invention, the Applicant has now understood that the problem of achieving adequate performances in terms of vehicle stability at high speeds, kilometric yield, wear regularity and uniformity, road behavior, both in straight stretches and in curves, and low weight can be solved by combining a carcass structure having at least one ply provided with reinforcing cords inclined with respect to the equatorial plane of the tire, with a belt structure including, in combination, at least one strip made of an elastomeric material incorporating a plurality of reinforcing cords inclined with respect to the equatorial plane of the tire and a radially outer layer comprising a plurality of zero-degree cords wound on the strip according to a preferred winding direction.

In a first aspect, the present invention therefore provides a tire of th e aforementioned type, which is characterized in that the belt structure further comprises a radially outer layer including a plurality of circumferential coils, axially arranged side by side, of at least one circumferentially inextensible cord wound at a substantially null angle with respect to the equatorial plane of the tire according to a winding direction adapted to compression-stress elastomeric material portions interposed between consecutive reinforcing cords incorporated in said at least one strip of the radially inner layer.

More specifically, the Applicant has found that the best results are obtained when the winding direction of said circumferentially inextensible cord, at the starting end of the winding, forms with the reinforcing cords of the radially inner belt layer an acute angle, measured moving away from the equatorial plane of the tire, having a value not lower than 25°.

According to the invention, the Applicant has in particular found that such tire structure achieves at the same time both the desired properties of comfort, wear regularity and uniformity and stability of the vehicle at high speeds along a straight-away and the desired properties of road holding, curve stability and low weight.

Thanks to the structural features of the carcass structure, in fact, the tire of the invention can develop high camber thrusts quite sufficient to balance the centrifugal thrust affecting the motor-bike, with a very homogeneous curve behavior.

Thanks to this feature, it was observed that a motor-bike equipped with a couple of tires having such a structure affords neutral driving behavior, so that the driver can travel the curvilinear trajectory by simply inclining the vehicle and without correcting its trim, in particular without correcting the steering angle of the handlebar.

According to the invention, furthermore, it was also unexpectedly found that, thanks to the structural features of the belt structure, the tire of the invention achieves on the one hand curvature thrusts and drift adequate to the requirements, provided by the combination of carcass plies with a suitable crown angle with the radially inner belt layer incorporating inclined cords and the outer belt layer incorporating the zero-degree cords, and on the other hand a uniform and regular wear provided by the radially outer belt layer comprising zero-degree cords wound on the radially inner layer according to a preferred winding direction.

Advantageously, the cross-plies carcass lends the tire transverse strength and curve stability, while the aforesaid belt structure lends the tire dimensional stability, directional stability and lower energy absorption, achieving at the same time a low rolling resistance and a substantial disappearance of the chunking phenomenon.

In particular, it was observed that the presence in the belt structure of a radially outer layer provided with zero-degree cords allows to increase both the directional stability and the ground-contacting area of the tire, i.e. the area of contact with the ground, in all the operating conditions of the tire.

Thanks to this feature, both the stresses due to scraping on the ground and the stresses due to hysteresis dissipation in the rubber composition of the tread are reduced, with a substantial reduction of the tire overheating due to the centrifugal force which develops during the running, counter-balanced by the substantial inextensibility of the radially outer layer provided with zero-degree cords of the belt structure.

Furthermore, the adoption of such a combination of carcass and belt structures contributes to reduce the tire weight, with all of the ensuing advantages in terms of reduction of the inertia effects due to the nonsuspended masses.

According to a particularly preferred embodiment of the invention, the carcass structure of the tire comprises at least a couple of superposed plies, each provided with reinforcing cords parallel to one another and oriented according to a direction inclined and opposite, preferably symmetrically, with respect to the equatorial plane of the tire with respect to the cords of the adjacent ply.

Preferably, the reinforcing cords incorporated in the ply (plies) of the carcass structure form a crown angle—measured at the equatorial plane of the tire—not smaller than 25° and, more preferably, comprised between 25° and 70° with respect to the equatorial plane of the tire.

In this way, an optimum curve behavior of the tire was observed, with the development of an adequate camber thrust.

In an alternative embodiment of the invention, it proves advantageous to insert between the carcass plies at least one sheet made of an elastomeric material as the crown angle formed by the reinforcing cords incorporated in the same plies reduces itself.

Such sheet may possibly incorporate adequate binding means suitable to increase its stretcheability properties without substantially altering the adhesion properties of the elastomeric material in the green state.

In this way, it is possible to absorb the tearing stresses which are developed between the plies of the carcass structure during rolling of the tire by means of a rather thin sheet having a thickness comprised between 0.075 mm and 0.5 mm.

Preferably, the aforesaid binding means comprises the so-called aramid pulp (short fibrillated fibers of poly-paraphenylene-terephtalamide), of the type commercially known as "Kevlar®-pulp" or "Twaron®-pulp" (Kevlar and Twaron are registered trademarks of DuPont and Akzo, respectively).

Preferably, said short fibrillated fibers are incorporated in the elastomeric material that makes up said sheet, in an amount comprised between 1 and 10 parts by weight per each 100 parts by weight of rubber composition (phr), and have a length comprised between 0.1 mm and 2.5 mm.

According to the invention, the belt structure coaxially extending around the carcass structure comprises a radially inner layer including at least one strip made of an elastomeric material incorporating a plurality of reinforcing cords essentially parallel to one another and oriented along directions inclined with respect to the equatorial plane of the tire.

Preferably, the reinforcing cords incorporated in the strip of the radially inner layer of the belt structure are symmetrically inclined with respect to the cords of the radially outer ply of the carcass structure.

Preferably, furthermore, the reinforcing cords incorporated in the strip of the radially inner layer of the belt structure are essentially constituted by high modulus fibers of a material selected from the group comprising: nylon, aramid, polyethylene naphthalene 2,6 dicarboxylate (PEN), polyethylene terephthalate (PET), and glass.

Still more preferably, the aforesaid reinforcing cords are essentially constituted by poly-para-phenylene-terephtalamide, commercially known as Kevlar® (DuPont trademark).

Preferably, the reinforcing cords incorporated in the strip of the radially inner layer of the belt structure form a crown angle—measured at the tire equatorial plane—not smaller than 25°, and still more preferably, comprised between 25° and 75° with respect to the equatorial plane of the tire.

In this way, an advantageous increase was observed in the effect carried out by the belt and/or carcass structures of containing the thrusts due to the centrifugal force.

Preferably, the reinforcing cords incorporated in the carcass ply (plies) or in the strip of the radially inner layer of the belt structure are made of a material different from the material of the reinforcing elements of the radially adjacent ply or strip.

In such a case, it is preferable to select materials having a modulus that increases by radially proceeding toward the outside; in so doing, a further advantageous increase was observed in the effect carried out by the belt structure of containing the thrusts due to the centrifugal force.

In an embodiment of the invention, the radially inner layer of the belt structure may further comprise an auxiliary supporting element essentially constituted by a sheet made of an elastomeric material incorporating appropriate binding means suitable to increase its stretcheability properties without substantially altering the adhesion properties of the elastomeric material in the green state.

In this way, it is advantageously possible to suitably space the zero-degree cords (preferably made of metal) from the reinforcing cords of the radially inner layer of the carcass structure, reducing possible fatigue phenomena on the carcass cords and interpenetration between the zero-degree cords and the reinforcing cords of the radially inner layer of the carcass structure.

Preferably, the aforesaid binding means comprises the so-called aramid pulp (short fibrillated fibers of poly-paraphenylene-terephtalamide), of the type commercially known as "Kevlar®-pulp" or "Twaron®-pulp (Kevlar and Twaron are registered trademarks of DuPont and Akzo, respectively).

Preferably, said short fibrillated fibers are incorporated in the elastomeric material that makes up said sheet, in an amount comprised between 1 phr and 10 phr, and have a length comprised between 0.1 mm and 2.5 mm.

Advantageously, said sheet made of an elastomeric material has a thickness comprised between 0.5 mm and 3 mm.

Preferably, said short fibrillated fibers are preoriented, for example by means of a calendering operation, according to the main direction of the forces which the supporting element is subjected to during the tire manufacturing method. Such direction is usually the circumferential direction of the tire and the aforementioned preorientation operation is preferably carried out by calendering said sheet during the manufacture thereof.

The elastomeric material reinforced with said aramid pulp has, at the green state, a tensile stress at break comprised between 3 mPa and 7 MPa, with a 50% elongation at a tensile stress comprised between 6.0 mPa and 3 MPa, while the same elastomeric material without aramid pulp has, at the green state, a tensile stress at break comprised between 1 and 2 mPa, with a 50% elongation at a tensile stress comprised between 0.2 mPa and 0.5 MPa.

Preferably, the material that constitutes said auxiliary supporting element is a natural rubber-based composition containing carbon-black in an amount comprised between 30 phr and 70 phr, filled with the usual ingredients known in the art (plasticizers, protecting agents, antidegradation agents, vulcanizers), so as to obtain an elastomeric matrix as similar as possible to that of the elements to which said sheet has to adhere.

As said hereinabove, the radially outer layer of the belt structure comprises a plurality of circumferential coils, axially placed side by side, of at least one inextensible cord, circumferentially wound at a substantially null angle with respect to the equatorial plane of the tire, and usually known in the art by the term of "zero-degree cords".

According to the invention, the winding direction of the cord(s) used to form the aforesaid coils is adapted to compression-stress the portions made of an elastomeric material interposed between consecutive reinforcing cords incorporated in the strip of the radially inner layer.

In other words, the winding direction of the cord is such that none of the reinforcing cords incorporated in the belt strip of the radially inner layer is so stressed as to move away from the adjacent cords, causing an undesired tearing stress that might separate from one another adjacent portions made of an elastomeric material.

Advantageously, this is obtained—as will be better apparent later on—by winding during the manufacture the zero-degree cord in a direction opposite to the rotation direction of the assembly drum, and in such a way that the stress imparted during the winding to the cords incorporated in the strip of the underlying radially inner layer of the belt structure has a component along a direction perpendicular to the cords and oriented toward the equatorial plane of the tire.

Advantageously, furthermore, even without any auxiliary supporting element, the belt strip can effectively hold the zero-degree cord(s) during the winding.

Preferably, the zero-degree cord or cords of the radially outer layer of the belt structure are high-elongation metal cords made of high carbon content steel wires.

Alternatively, the zero-degree cords may be aramid textile cords.

When a tire to be mounted on the rear wheel of a motor-bike is to be manufactured, the cord coils arranged at a substantially null angle with respect to the equatorial plane of the tire are preferably distributed with a constant density throughout the axial development of the belt structure.

Instead, when a tire to be mounted on the front wheel of a motor-bike is to be manufactured, the cord coils arranged at a substantially null angle with respect to the equatorial plane of the tire are preferably distributed with a variable density throughout the axial development of the belt structure.

According to this last embodiment of the invention, the distribution density of the cord coils progressively changes along the layer, from the equatorial plane toward the ends, preferably according to a prefixed relation, having a value not higher than 15 cords/cm in an area placed on either side of the equatorial plane of the tire.

In this way, it is advantageously possible to obtain a belt structure which is at the same time flexible in the middle, to absorb and damp the vibrations due to the ground roughness, and rigid along the sides, to develop high slip thrusts.

According to the experiments of the Applicant, such relation may conveniently have the following expression:

$$Nx = K \frac{R^2}{r^2} No$$

wherein:
No is the number of cord coils arranged in a central portion of unitary length located on either side of the equatorial plane of the belt structure;
R is the distance between the center of said portion and the rotation axis of the tire;
r is the distance between the center of the generic unitary portion comprised between the equatorial plane and the ends of said radially outer layer of the belt structure and the rotation axis of the tire;
K is a parameter that takes into account the constituent material and the formation of cords, as well as the amount of rubber around the cord, and the weight of a portion of the radially inner layer of the belt structure at said unitary portion, which is variable with variations in the material type and in the structural features of the radially inner layer of the belt structure along the crown profile that diverge from the reference values.

This parameter K may have a value of substantially close to 1 if all the cords have the same formation and all the connected materials are the same throughout the layers, or different values according to the variations in the materials and formation of the reinforcing elements along the peripheral development of the belt structure.

A distribution of the cords in accordance with such relation ensures both uniformity of the stress acting on the belt structure during use of the tire as a consequence of the centrifugal force applied, and the necessary differentiated stiffness along the axial direction.

Obviously, those skilled in the art may find other relations which, depending on the aforesaid design variables, would allow to obtain at the same time a differentiated stiffness along the axial direction and a stress uniformity in the belt structure of the running tire, by varying in a controlled and predetermined manner the density of the aforesaid cords.

As to the density of the zero-degree cords in the portion located on either side of the equatorial plane, where the maximum thinning out take place, this density, for a tire to be mounted on the front wheel is preferably not greater than 8 cords/cm and more preferably comprised between 3 cords/cm and 6 cords/cm.

For a tire to be mounted on the front wheel, the width of said portion varies preferably from 10% to 30% of the axial development of the belt.

Conveniently, for a tire to be mounted on the front wheel the quantity of cords in said central portion is equal to a value comprised between 60% and 80% of the cords quantity near the shoulders of the tire, where the density of said cords is preferably not greater than 10 cords/cm and more preferably included between 6 cords/cm and 8 cords/cm.

According to a second aspect, the invention also provides a method for the manufacture of a high transverse curvature tire as described above, comprising the steps of:

provinding on a main assembly drum a carcass structure comprising at least one ply provided with reinforcing cords essentially parallel to one another and oriented along directions inclined with respect to the equatorial plane of the drum;

providing on a comb-like drum at least one strip made of an elastomeric material incorporating a plurality of reinforcing cords essentially parallel to one another and oriented along directions inclined with respect to the equatorial plane of the drum;

imparting to said at least one strip a curvilinear transverse profile by radially expanding a plurality of radially mobile sectors associated to the comb-like drum;

circumferentially winding on said at least one strip at least one inextensible cord, so as to form a plurality of circumferential coils consecutively arranged side by side, and to define a belt structure having a curvilinear transverse profile;

circumferentially associating a tread around the belt structure;

associating the belt structure, together with said tread, around the carcass structure, wherein said at least one inextensible cord is wound on said at least one strip of the belt structure at a substantially null angle with respect to the equatorial plane of the comb-like drum and according to a winding direction adapted to compression-stress portions made of an elastomeric material interposed between consecutive reinforcing cords incorporated in said at least one strip of the radially inner layer.

In a preferred embodiment of the method, the inextensible cord is wound on the strip of the belt structure in such a way as to obtain cord coils distributed with variable density, preferably in accordance with the above explained distribution law, throughout the axial development of the belt structure.

Advantageously, as explained above, it was found that the belt strip can effectively retain the zero-degree cord or cords during the winding step, even without auxiliary elements designed to increase the adhesion properties of the zero-degree cords on the same.

According to an alternative embodiment, the method of the invention may further include the step of applying on the strip of the belt structure an auxiliary supporting element essentially constituted by a sheet made of an elastomeric material, in particular and preferably incorporating appropriate binding means suitable to increase its features of stretcheability without substantially altering the adhesion properties thereof.

According to still a further embodiment, the method of the invention may comprise the additional step of applying a sheet made of an elastomeric material, between the carcass plies, with the purpose—as explained hereinabove—of absorbing the tearing stresses that are developed between the aforesaid plies during tire rolling.

Advantageously, said sheets made of an elastomeric material incorporate binding means having the features described hereinabove.

BRIEF DESCRIPTION OF THE DRAWINGS

Additional features and advantages will be more readily apparent by the following description of a preferred embodiment of a tire according to the invention, solely provided by way of non limitative indication, reference being made to the attached drawings.

In such drawings.

DETAILED DESCRIPTION OF PREFERRED EMBODIMENTS

Figure 1:
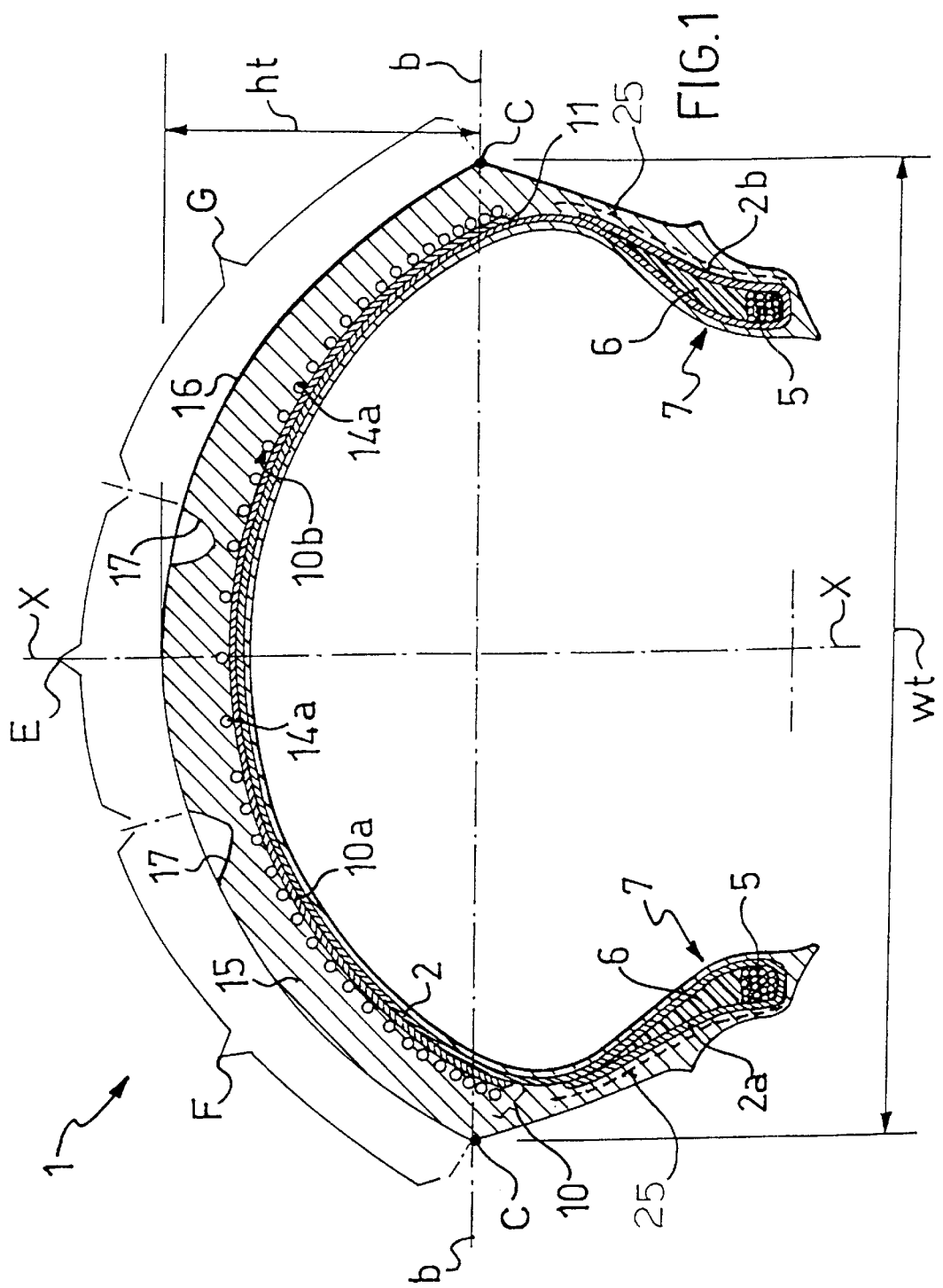
FIG. 1 shows a cross-section view of a tire according to the invention.

In FIG. 1, 1 indicates a high-transverse-curvature tire intended for two-wheeled vehicles, in particular a tire to be mounted on the front wheel of a high-performance motorbike of the so-called "touring" type.

As is known, the extent of the tire transverse curvature is defined by the specific value of the ratio, generally known by the term of "camber", between the distance ht (measured along the equatorial plane X—X) of the tread crown from the line b—b passing through the ends C of the tread and the distance wt measured along the tire chord, between said ends.

If the tread ends cannot be easily identified, for instance due to the lack of a precise reference such as for instance the edge indicated by C in FIG. 1, the value of the tire maximum chord may be assumed as the distance wt.

Tire 1 comprises a carcass structure 2, including at least one carcass ply whose opposite side edges 2a, 2b are turned around respective bead cores 5.

On the external peripheral edge of bead cores 5, an elastomeric filling 6 is applied which fills the space defined between the carcass structure 2 and the corresponding turned side edges 2a, 2b of the same.

As is known, the tire area comprising bead cores 5 and filling 6 forms the so-called bead, globally indicated by 7, intended for anchoring the tire 1 onto a corresponding mounting rim, not shown.

Figure 2:
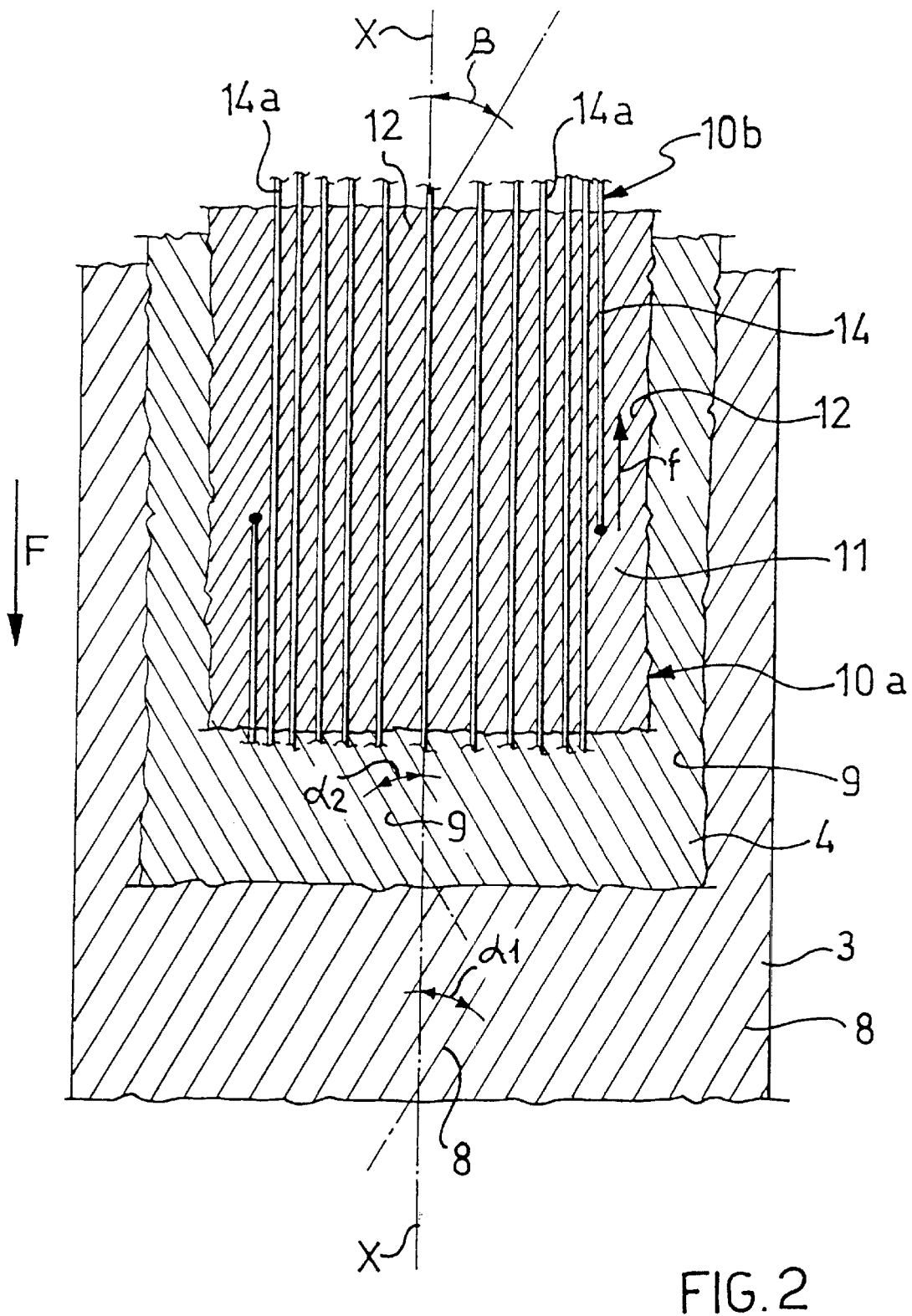
FIG. 2 shows a plan view, schematic and simplified, of some portions of the carcass and belt structures of the tire of FIG. 1.

According to a preferred embodiment, the carcass structure 2 comprises a couple of radially inner and radially outer carcass plies 3, 4, essentially constituted by a sheet of an elastomeric material known per se, for instance made of a natural rubber-based material, incorporating a plurality of reinforcing cords 8, 9 (FIG. 2).

Advantageously, said reinforcing cords are essentially parallel to one another and oriented according to inclined directions in each ply and opposed with respect to the cords of the adjacent ply with respect to the equatorial plane X—X of the tire 1.

The reinforcing cords 8 of the radially inner carcass ply 3 are constituted by nylon textile fibers, and form an angle $\alpha_1$ of about 50° with respect to the equatorial plane X—X of the tire 1 (FIG. 2).

The reinforcing cords 9 of the radially outer carcass ply 4 are constituted by rayon textile fibers and are symmetrically inclined with respect to cords 8 of the radially inner ply 3, forming an angle $\alpha_2$ of about 50° with respect to the equatorial plane X—X of the tire 1 (FIG. 2).

According to a preferred embodiment, the carcass structure 2 also comprises a strip 25 made of a reinforcing textile material in an axially outer position with respect to the turned side edges 2a, 2b of the same. More particularly, the strip 25 is radially extending from a radially inner edge of bead core 5 up to at least the free end of the turned side edges 2a, 2b and preferably slightly beyond the same, and includes reinforcing cords made of metal or textile material, such as for instance nylon, rayon or aramid.

Preferably, such reinforcing cords are essentially parallel to one another and are oriented according to inclined directions, preferably in an opposite direction with respect to the reinforcing cords 9 of the radially outer ply 4 of the side turned edges 2a, 2b adjacent to the strip 25, which reinforcing cords form an angle comprised between 20° and 50° with respect to the radial direction of the tire 1.

A belt structure 10, which comprises a radially inner layer 10a and a radially outer layer 10b, both comprising reinforcing elements of the structure, is coaxially associated to said carcass structure 2.

More particularly, the radially inner layer 10a comprises a strip 11 made of rubberized material incorporating a plurality of reinforcing cords 12 essentially parallel to one another and oriented along directions symmetrically inclined with respect to the equatorial plane X—X of the tire 1 with respect to the reinforcing cords 9 of the radially outer ply 4 of the carcass structure 2.

Preferably, the reinforcing cords 12 form an angle β of about 70° with respect to the equatorial plane X—X of the tire 1 (FIG. 2).

Preferably, the belt structure 10 has a reduced stiffness as compared to the belts of the known art at an equatorial zone "E" (comprised between 10% and 30% of the axial development of the belt) located on either side of the equatorial plane X—X (FIG. 1); such lower, stiffness may be conveniently obtained by acting on the density of the reinforcing cords 12, or on the material which constitute the same, or on their orientation with respect to the equatorial plane X—X, or on any combination of said parameters.

In particular for a given material, structure and lying angle the global density of the reinforcing cords which cross a right section of unitary width, on either side of the equatorial plane X—X, in an oblique direction with respect to said plane, as shown in FIG. 2, is not higher than and preferably lower than the usual density of said conventional belt, notoriously of the order of 14 cords/cm.

Conveniently, the reinforcing cords 12 of the strip 11 are monofilaments and/or yarns, either twisted or untwisted, and their cords are made of different textile materials, such as natural fibers like rayon or cotton, synthetic fibers like polyamide, for instance nylon and aramid, or also of metal.

The radially outer layer 10b of belt structure 10 comprises a plurality of circumferential coils 14a, axially placed side by side, of a cord 14 or a tape of few cords (preferably 2 to 5), circumferentially inextensible, spirally wound from one end to the other of the carcass structure 10.

It is here specified that the following description will always refer to cords, which term is intended to indicate also the individual elementary wires or the untwisted yarns, whenever the text will allow.

Besides, it is also pointed out that a constant winding pitch along the peripheral development of the belt structure 10 gives rise in any case, due to the curvature of the carcass structure 2, to a variable density along the axial direction.

According to the aforesaid arrangement, the cords 14 form a plurality of circumferential coils 14a, substantially oriented according to the rolling direction of the tire, usually called "zero-degree" arrangement with reference to its position with respect to the equatorial plane X—X of the tire 1.

Preferably, the cord coils 14a are wound on the carcass structure 2 according to a prefixed pitch, which is constant in the case of a rear tire and variable in the case of a front tire, in the latter case with a variable density, which increases from the center toward the ends of the belt structure 10, as will appear more clearly hereinbelow.

Even though the coiling by itself and the pitch variability involve a winding angle different from zero, this angle remains so small that it may be substantially considered as always equal to zero degrees.

According to the invention, the cord 14 is wound according to a winding direction adapted to compression-stress the portions made of an elastomeric material interposed between adjacent reinforcing cords 12 incorporated in the underlying strip 11 of the radially inner layer 10a.

In other words, the winding orientation of the cord 14 is such that the reinforcing cords 12 incorporated in the underlying strip 11 of the radially inner layer 10a and in contact with the cord 14 are traction-stressed according to a direction which is oriented away from the equatorial plane of the tire 1.

Advantageously, this is achieved—as will appear more clearly hereinbelow—by anchoring the initial portion of the cord 14 on the strip 11 in such a way as to distribute the tearing stress that is generated at the start up of the respective assembly drum on a prefixed number (preferably 4 to 10 or more) of cords 12 of the strip 11, and by winding the cord 14 in a direction such that the stress imparted to the cords 12 incorporated in the strip 11 has a component in a direction perpendicular to the, cords 12 which is oriented toward the equatorial plane X—X of the tire 1.

In a preferred embodiment, the aforesaid cords 14 are the well known high elongation (HE) metallic cords, the use and the features of which have already been widely described, for instance in European Patent no. 0 461 464 of the same Applicant.

More in detail, such cords are constituted by a given number of strands, 1 to 5, preferably 3 to 4, each strand being constituted by a given number of individual wires, 2 to 14, preferably 4 to 10, having a diameter greater than 0.10 mm, preferably comprised between 0.12 mm and 0.35 mm. The wires in the strands and the strands in the cord are helically wound together in the same direction, with winding pitches equal or also different for the wires and the strands.

Preferably, such cords are made of high carbon (HT) content steel wires, i.e. steel wires with a carbon content higher than 0.9%. In particular, in a specific prototype prepared by the Applicant, the helical winding of the layer 10b was constituted by a single cord 14, known as 3×4×0,20 HE HT, spiralled from one end of the belt structure to the other: the above description defines a metal cord formed of three strands each consisting of four elementary wires wound in the same direction as the strands and having a diameter of 0.20 mm; as is known, the abbreviation HE means "high elongation" and the abbreviation HT means "high tensile" steel.

Such cords have an ultimate elongation comprised between 4% and 8%, and a typical behavior to tensile stress, the well known and so called "spring behavior".

Because of this behavior—desired, on the other hand—it is possible to advantageously control the pre-loading condition of the zero-degree winding in the green tire, before the vulcanization.

This may be conveniently carried out for instance by winding the cord(s) while imparting some stress around the radially inner layer 10a previously arranged on the assembly drum: obviously, only a layer having a sufficient mechanical strength—as will be seen—can support the winding of a stressed cord without tearing apart.

Clearly, the preferred use of metal cords does not exclude, for the purposes of the invention, the use of other cords, in particular the likewise known textile cords made of aramid fiber, commercially known as Kevlar®, a registered trademark of DuPont.

As said hereinabove, when a tire adapted to be mounted on the front wheel of a motor-bike is to be manufactured, the distribution density of the cord coils 14a preferably progressively varies along the outer layer 10b, from the equatorial plane X—X of the tire 1 toward the opposite shoulder portions F, G of the same, preferably according to a prefixed relation.

In a particularly advantageous embodiment, the aforesaid relation keep to a substantially constant value along the axial development of the belt structure 10 the product of the mass of coils 14a of the cord 14 arranged within a unitary portion of a given value by the square of the distance between the center of said portion and the rotation axis of the tire 1, so that during tire rolling the resulting centrifugal forces in each of said portions have all the same value, causing a uniform stress state from one end to the other of the belt structure 10.

Preferably, the axial density according to which the coils 14a of the cord 14 are distributed is determined by the following relation:

$$Nx = K \frac{R^2}{r^2} No$$

wherein:

No is the number of coils 14a of the cord 14 arranged in a central portion of unitary value, for instance 1 cm, located on either side of the equatorial planed X—X, R is the distance between the center of said central portion in the radially outer layer 10b and the rotation axis of the tire 1;

r is the distance between the center of one of said unitary portions located in the region comprised between the center and the ends of the radially outer layer 10b of the belt structure 10 and the rotation axis of the tire 1;

K is a parameter that takes into account the constituent material and the formation of cords 14, as well as the amount of rubber around the cord 14 and the weight of the radially inner layer portion 10a of the belt structure 10 at said unitary portion, which is variable with variations in the material type and in the structural features of the radially inner layer 10a of the belt structure 10 along the crown profile that diverge from the reference values.

This parameter K may take a value substantially close to 1 if the cords 14 have the same formation and all the connected materials are the same throughout the layers, and different values according to variations of materials and formation of the reinforcing elements along the peripheral development of the belt structure 10.

Solely by way of example, a layer including zero-degree cords might be devised comprising textile cords (of aramid) in a central position and metal cords (HE) in the adjacent side portions, and vice-versa.

Clearly, those skilled in the art may find other relations which, according to the aforesaid design variables, would allow to achieve at the same time a differentiated stiffness along the axial direction and a stress uniformity in the belt structure of the running tire, by,varying in a controlled and predetermined manner the density of the aforesaid cords.

As to the density of the zero-degree cords in the equatorial zone E, where the maximum thinning out, takes place, said density, for a tire to be mounted on the front wheel is preferably not greater than 8 cords/cm and more preferably comprised between 3 cords/cm 6 cords/cm and 8 cords/cm.

The width of said equatorial zone E is preferably comprised between 10% and 30% of the axial development of the belt structure 10.

For a tire to be mounted on the rear wheel, the quantity of cords 14 in said equatorial zone E is equal to a value comprised between 80% and 100% of the quantity of cords near the shoulder portions F, G of the tire 1, where the density of said cords is preferably not greater than 10 cords/cm more preferably comprised between 8 cords/cm and 10 cords/cm.

Figure 3:
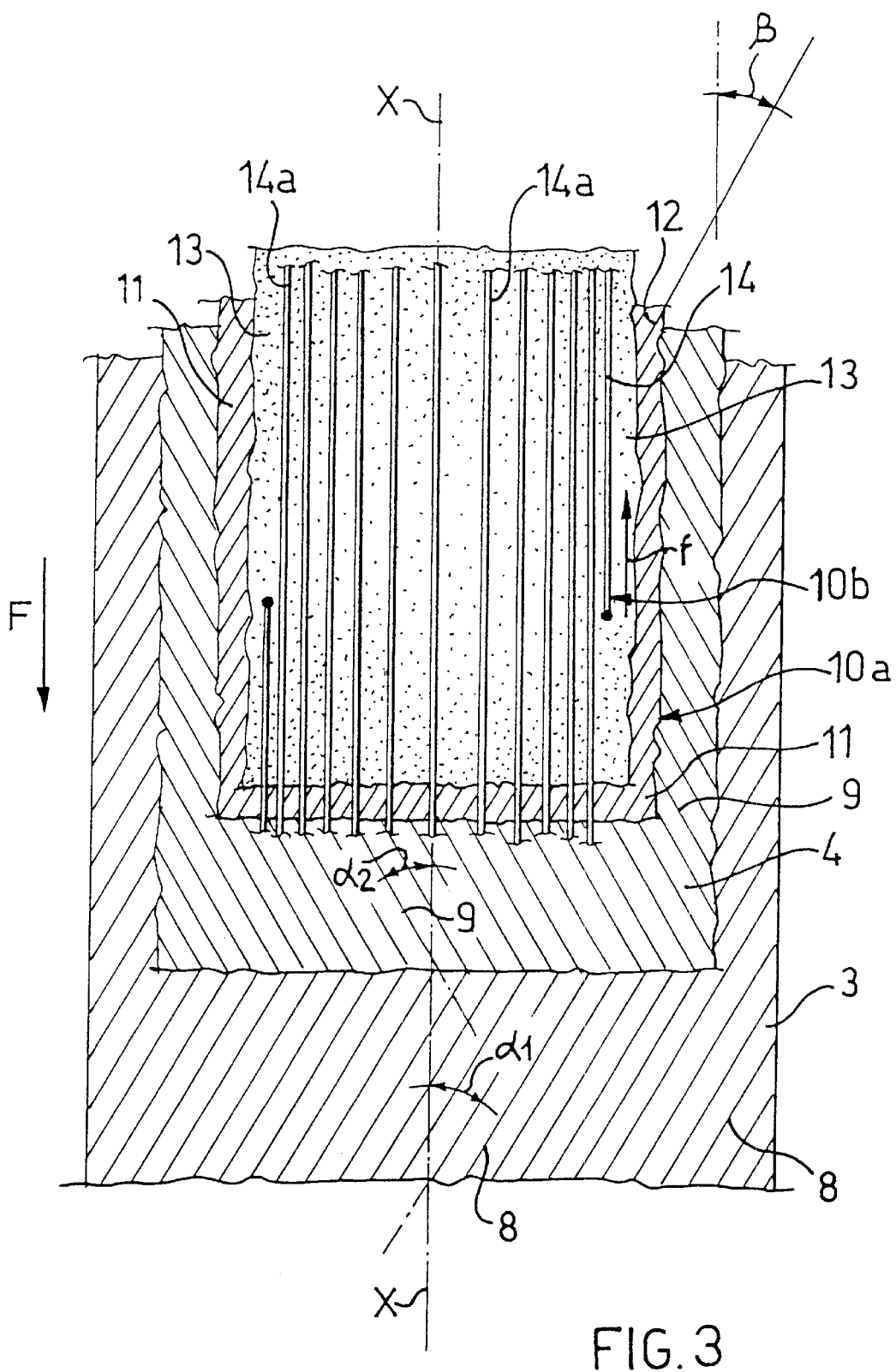
FIG. 3 shows a plan view, schematic and simplified, of some portions of the carcass and belt structures of an alternative embodiment of the tire of the invention.

According to an alternative embodiment, shown in FIG. 3, the radially inner layer 10a of the belt structure 10 further comprises an auxiliary supporting element essentially constituted by a sheet 13 made of an elastomeric material.

Preferably, the elastomeric material that constitutes the auxiliary element incorporates homogeneously dispersed reinforcing fibrous fillers of a material selected from the group comprising textile and metal fibers, fiberglass or short fibrillated aramid fibers.

Conveniently, the same auxiliary element incorporates as a reinforcing fibrous filler the so-called aramid pulp (short fibrillated fibers of poly-paraphenylene-terephtalamide), of the type commercially known as "Kevlar®-pulp" or "Twaron®-pulp", (Kevlar and Twaron are registered trademarks of DuPont and Akzo, respectively), or equivalent binding means, suitable to increase the properties of mechanical strength and stretcheability of the elastomeric material in the green state, without substantially altering the adhesion properties thereof.

It has in fact been found that in the presence of the aramid fibers dispersed in the elastomeric material that makes it up, the auxiliary supporting element 13 may take the form of an extremely thin sheet, without undergoing any laceration as a consequence of the permanent sets caused to the same during the tire manufacturing steps.

More particularly, it has been found that the best results are achieved by incorporating the aramid pulp in the composition of the green elastomer in a quantity of from 1 phr to 10 phr (parts by weight per 100 parts of rubber) and using fibers of a length comprised between 0.1 mm and 2.5 mm.

In this way, it is advantageously possible to make and use, in manufacturing the tire 1, an auxiliary element 13 of reduced weight having a thickness preferably in the order of 0.25 mm or less.

The resistance to mechanical stresses imparted to the auxiliary element 13 during the manufacturing steps of the tire 1 may be further increased by shaping such auxiliary element through calendering, so that the aramid fibers may be preoriented according to a preferred direction in the elastomeric sheet which forms the auxiliary element. Such preferential direction may usually be, at least for the type of use of the described tire, the circumferential direction of the tire, coincident with the longitudinal direction of the sheet coming out of the calendering machine.

A tread 15, by means of which the tire 1 gets in touch with the ground, is applied in a known manner onto the belt structure 10 described hereinabove.

The tread 15 is subsequently molded with a suitable tread pattern comprising in a known way a plurality of blocks, all indicated by 16, defined between a plurality of grooves 17, of which only some are visible in FIG. 1.

With special reference to FIGS. 4–8, the operating steps of a method according to the invention for the manufacture of the above described tire 1 will now be illustrated.

In a first operating step, not shown in any figure, the carcass structure 2 comprising the two superposed plies 3, 4, between which it may be possibly interposed a sheet made of an elastomeric material preferably incorporating suitable binding means, as well as a strip 35 of textile reinforcing material externally associated to the opposite free ends of ply 4, is applied in a known manner on a main assembly drum 18, so as to be subsequently shaped according to a curvilinear transverse profile, as will appear more clearly hereinbelow.

Figures 4, 5, 6:
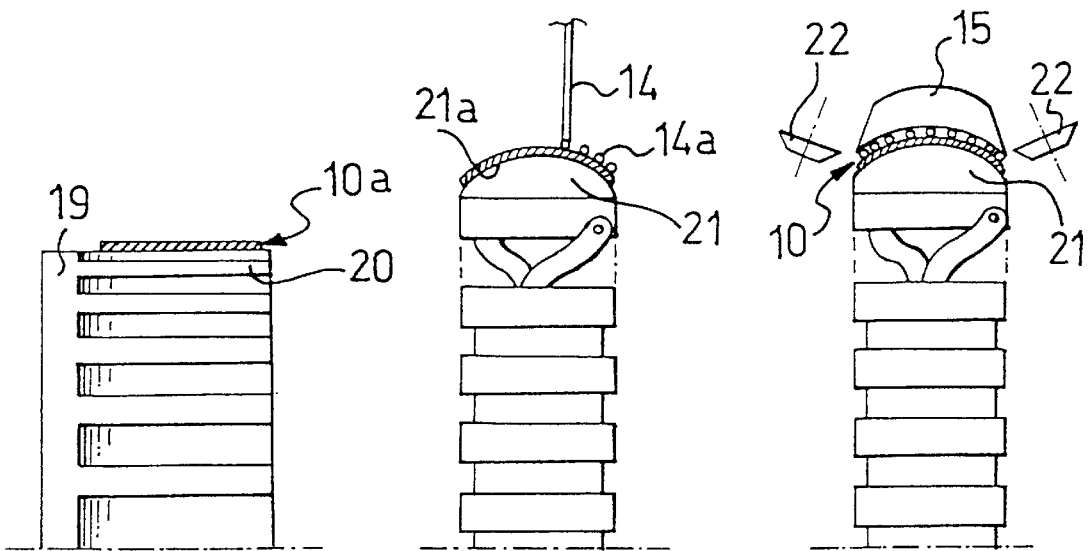
FIGS. 4–8 schematically show some steps of the tire manufacturing method according to the present invention.
Figures 7, 8:
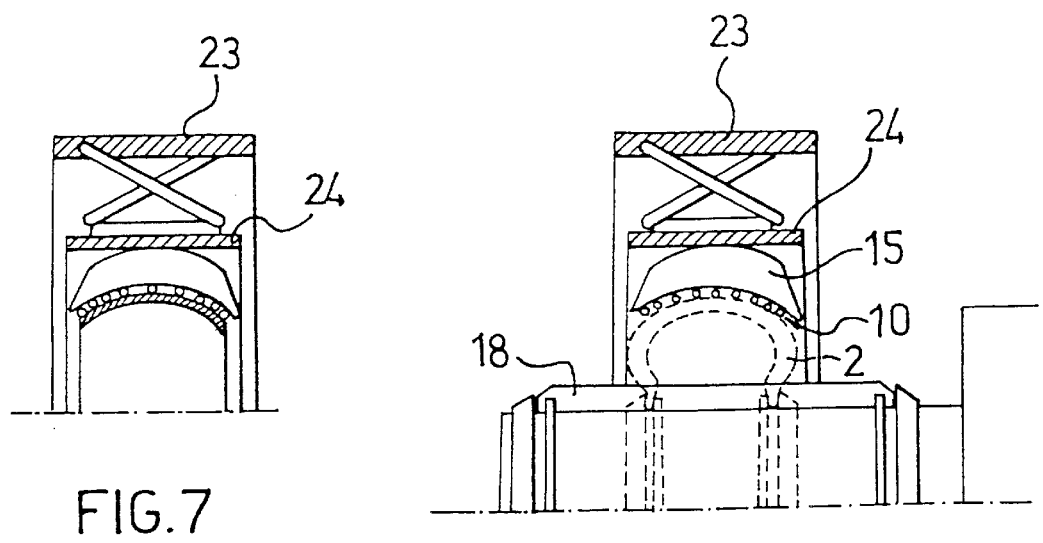

In a second step, the belt structure 10 (and possibly the auxiliary supporting element 13, if it is present) forming the radially inner layer 10a of belt structure 10 is placed on a comb-like drum 19 comprising a plurality of fingers 20 circumferentially spaced from one another and so arranged as to constitute a cylindrical surface of a prefixed diameter (FIG. 4).

Afterwards, the radial expansion of a plurality of convex sectors 21 through the openings defined between the fingers 20 of the comb-like drum 19 and their subsequent removal from said drum is carried out (FIG. 5).

In this way, the strip 11 (and possibly the auxiliary supporting element 13) undergoes a permanent deformation to assume the outer curvilinear profile of the convex sectors 21.

Advantageously, the radially outer profile 21a of the convex sectors 21 substantially corresponds to the high transverse curvature toric profile of the finished tire, or better, to the toric profile of the radially inner surface of the belt structure of the same.

In this way, therefore, the cross-section profile imparted to the belt structure 10 substantially corresponds to the profile of the tire 1.

On the radially inner layer 10a of the belt structure 10 so conformed, it is subsequently carried out the winding of the inextensible cord 14 according to a plurality of coils 14a consecutively arranged side by side, for instance starting from one of the edges of the auxiliary supporting element 13, as shown in FIG. 5.

In this step, the adhesiveness of the green elastomeric material constituting the strip 11 ensures the stable positioning of the individual coils 14a formed on the expandable sectors 21, without running the risk that such coils undesirably slide along the outer profile of said sectors.

As illustrated hereinabove, the inextensible cord 14 is wound according to a winding direction indicated by arrow "f" in FIGS. 2 and 3, adapted to compression-stress the portions made of elastomeric material interposed between adjacent reinforcing cords 12 incorporated in the strip 11 of the radially inner layer 10a.

In other words, the winding direction "f" of cord 14 is adapted to form with cords 12 incorporated in the strip 11 and at the starting end of the winding, an acute angle $\beta$, measured moving away from the equatorial plane of the tire, preferably comprised between 25° and 75°, and equal to 70° in the specific example considered herein.

This is advantageously achieved by winding the cord 14 in a winding direction "f" such that the stress imparted to the cords 12 incorporated in the strip 11 has a component in a direction perpendicular to the cords 12 and oriented toward the equatorial plane X—X of the tire 1.

Preferably, the winding direction "f" of the inextensible cord 14 is opposite to the rotation direction of the expandable sectors 21, which direction is indicated by the letter "F" in the same FIGS. 2 and 3.

Once the winding is concluded, the tread 15 is applied, with the help of possible pressure rollers 22 (FIG. 6), on the belt structure 10 formed on the expandable sectors 21 of the comb-like drum 19.

In a known way, the belt structure 10, together with the tread 15 applied on the same, is taken by a transfer ring 23 provided with suitable gripping means 24, to be fitted coaxially on the carcass structure 2 previously formed on the main assembly drum 18.

Carcass plies 3,4, initially provided in the form of a cylindrical sleeve, are radially expanded by axially approaching the bead cores 5, which operation is controlled by the main assembly drum 18, and possibly by injection of air in its inside, to obtain its application against the radially inner surface of the belt structure 10 and, more precisely, of the strip 11.

The so assembled tire 1 will be subsequently removed from the main assembly drum 18 to be submitted—in a manner known per se—to the final step of mold vulcanization.

In order to evaluate the quality improvements achieved by the tires of the invention, a set of tests was carried out to compare the tires of the invention with tires of known type for the same use and having a different structure.

More particularly, the tires of the invention in the specific embodiment described hereinabove were mounted on the front and rear wheels of a motor-cycle of the so-called "touring" type, so as to compare them with the following couples of tires of known type:

1) a first couple of tires Model Metzeler ME1 (type A) provided with a cross-plies carcass and with a belt structure constituted by couples of rubberized fabric strips having cords placed at an angle with respect to the equatorial plane of the tire on both the front and the rear heel;
2) a second couple of tires (type B) comprising:
   2a) a rear tire Model Metzeler MEZ2 provided with a radial carcass and with a belt structure comprising a winding of zero-degree cords;
   2b) a front tire Model Metzeler MEZ2 provided with a radial carcass and with a belt structure constituted by couples of strips of rubberized fabric having cords placed at an angle with respect to the equatorial plane of the tire.

The characteristics of the motor-bike used in the tests were the following:

| - model        | : | BMW TOURING      |
|----------------|---|------------------|
| - front tire   |   |                  |
| size           | : | 120/70-B17 58 V  |
| inflation pressure | : | 2.5 bar      |
| rim            | : | 3.50"            |
| - rear tire    |   |                  |
| size           | : | 160/70-B17 79 V  |
| inflation pressure | : | 2.9 bar      |
| rim            | : | 4.50"            |

The tests were directed to evaluate the quality level of the main parameters of driving behavior especially those dependent on the constitution of the carcass structure/belt structure assembly, assigning a mark comprised between 0 and 10 to each parameter considered.

Table I hereinbelow shows the results of the tests.

TABLE I

| Parameter | Type A | Type B | Invention |
|---|---|---|---|
| Shimmy | 5 | 6 | 8 |
| Handling | 7 | 6 | 8 |
| Directional stability | 5 | 6 | 8 |
| Curve roadholding | 6 | 5 | 8 |
| Comfort | 5 | 7 | 8 |
| Wear uniformity | 6 | 7 | 7 |
| Kilometric yield | 5 | 7 | 7 |

By examining the results of the above table it appears immediately evident the improvement achieved by the tires according to the invention as compared with those of the prior art.

Besides, it must be pointed out that such improved results have been achieved together with a weight reduction with respect to the tires designed for use on the test motor-bike, weight reduction which may be estimated to be about 0.2 kg for the front tire and about 0.5 kg for the rear tire, to the advantage of an inertia reduction due to the nonsuspended masses and, consequently, of the vehicle handling.

Obviously, those skilled in the art may introduce modifications and variants to the above described invention in order to satisfy specific and contingent application requirements, which modification and variants fall anyhow within the scope of protection as is defined by the appended claims.

What is claimed is:

1. A high transverse-curvature motor-bike tire, comprising:
    a carcass structure including at least one ply provided with reinforcing cords essentially parallel to one another and oriented along directions inclined with respect to an equatorial plane of the tire;
    a belt structure coaxially extending around the carcass structure and including a radially inner layer comprising at least one strip made of an elastomeric material incorporating a plurality of reinforcing cords essentially parallel to one another and oriented along directions inclined with respect to the equatorial plane of the tire; and
    a tread coaxially extending around the belt structure;
    wherein the belt structure further comprises a radially outer layer including a plurality of circumferential coils, axially arranged side-by-side, of at least one circumferentially inextensible cord wound at a substantially null angle with respect to the equatorial plane of the tire according to a winding direction adapted to compression-stress, at least during initial winding, elastomeric material portions interposed between consecutive reinforcing cords incorporated in the at least one strip of the radially inner layer.

2. The tire of claim 1, wherein the carcass structure comprises at least two superposed plies, each ply provided with reinforcing cords essentially parallel to one another and oriented along directions inclined with respect to the equatorial plane of the tire, and wherein the reinforcing cords of at least two adjacent plies are oriented in opposite directions with respect to the equatorial plane of the tire.

3. The tire of claim 2, further comprising a sheet made of an elastomeric material interposed between at least two of the superimposed plies of the carcass structure.

4. The tire of claim 1, wherein the reinforcing cords incorporated in the at least one ply of the carcass structure form an angle not smaller than 25° with respect to the equatorial plane of the tire.

5. The tire of claim 1, wherein the reinforcing cords incorporated in the at least one strip of the radially inner layer of the belt structure form an angle not smaller than 25° with respect to the equatorial plane of the tire.

6. The tire of claim 1, wherein the reinforcing cords incorporated in the at least one carcass ply or in the at least one strip of the radially inner layer of the belt structure are made of a material different from the material of the reinforcing cords in the radially adjacent ply or strip.

7. The tire of claim 1, wherein the radially inner layer of the belt structure further comprises an auxiliary supporting element essentially constituted by a sheet made of an elastomeric material.

8. The tire of claim 7 or 3, wherein the sheet made of an elastomeric material incorporates appropriate binding means suitable to increase stretchability properties of the sheet without substantially altering adhesion properties of the sheet.

9. The tire of claim 8, wherein the binding means comprises aramid pulp.

10. The tire of claim 1, wherein the cord coils, arranged at a substantially null angle with respect to the equatorial plane of the tire, are distributed with a variable density throughout an axial development of the belt structure.

11. The tire of claim 10, wherein a density of the cords coils progressively increases away from the equatorial plane of the tire, the density having a value not greater than 15 cords/cm in a portion located on either side of the equatorial plane of the tire.

12. The tire of claim 11, wherein the density of the cord coils is determined by the following relation:

$$Nx = K \frac{R^2}{r^2} No$$

wherein:

No is a number of cord coils arranged in a central portion of unitary length located on either side of the equatorial plane of the tire;

R is a distance between a center of the central portion and a rotation axis of the tire;

r is a distance between a center of a generic unitary portion located between the equatorial plane of the tire and ends of the radially outer layer of the belt structure, and the rotation axis of the tire; and K is a parameter that takes into account constituent material and formation of the at least one cord, as well as an amount of rubber around the cord, and a weight of a portion of the radially inner layer of the belt structure at the unitary portion, which is variable with variations in material type and structural features of the radially inner layer of the belt structure along a crown profile that diverges from reference values.

* * * * *